US010174779B2

(12) United States Patent
Friedrich et al.

(10) Patent No.: US 10,174,779 B2
(45) Date of Patent: Jan. 8, 2019

(54) LOW PROFILE BOLT/CLIP ASSEMBLY

(71) Applicant: GM Global Technology Operations LLC, Detroit, MI (US)

(72) Inventors: Marc L. Friedrich, Rochester Hills, MI (US); Martin K. Scott, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 15/183,290

(22) Filed: Jun. 15, 2016

(65) Prior Publication Data
US 2017/0363133 A1    Dec. 21, 2017

(51) Int. Cl.
| F16B 25/00 | (2006.01) |
| F16B 33/00 | (2006.01) |
| F16B 39/02 | (2006.01) |
| F16B 41/00 | (2006.01) |
| B60R 16/02 | (2006.01) |
| F16B 2/04 | (2006.01) |
| F16B 35/06 | (2006.01) |
| H02G 3/32 | (2006.01) |

(52) U.S. Cl.
CPC .............. *F16B 33/00* (2013.01); *B60R 16/02* (2013.01); *B60R 16/0215* (2013.01); *F16B 2/04* (2013.01); *F16B 35/06* (2013.01); *F16B 39/02* (2013.01); *F16B 41/002* (2013.01); *H02G 3/32* (2013.01)

(58) Field of Classification Search
USPC .................. 411/396, 407, 372.5, 372.6, 373; 248/274.1, 274.3, 274.4, 274.5, 68.1, 71, 248/73, 74.2, 74.3, 74.4
See application file for complete search history.

(56) References Cited

U.S. PATENT DOCUMENTS

| 2,346,769 | A | * | 4/1944 | Lichtor | .......................... 411/396 |
| 2,627,778 | A | * | 2/1953 | Hodell | ...................... A47G 3/00 |
| | | | | | 261/DIG. 38 |
| 3,550,219 | A | * | 12/1970 | Van Buren, Jr. | ...... F16B 21/075 |
| | | | | | 248/73 |
| 4,911,593 | A | * | 3/1990 | Kephart | .............. F16B 23/0038 |
| | | | | | 411/403 |
| 5,368,261 | A | * | 11/1994 | Caveney | .................. F16L 3/233 |
| | | | | | 248/69 |
| 5,382,125 | A | * | 1/1995 | Durr | ..................... A61B 17/685 |
| | | | | | 411/383 |
| 5,795,116 | A | * | 8/1998 | Frank | ...................... F16B 31/02 |
| | | | | | 411/1 |
| 5,827,029 | A | * | 10/1998 | Denman | ............... F16B 41/005 |
| | | | | | 411/373 |
| 6,302,630 | B1 | * | 10/2001 | Grant | ....................... A47G 3/00 |
| | | | | | 411/372.6 |
| 6,669,150 | B2 | * | 12/2003 | Benoit | .................. F16B 21/084 |
| | | | | | 248/71 |
| 7,159,894 | B2 | * | 1/2007 | Ronne | ................... B60R 21/213 |
| | | | | | 280/728.2 |

(Continued)

*Primary Examiner* — Gary W Estremsky
(74) *Attorney, Agent, or Firm* — Harness, Dickey & Pierce, P.L.C.

(57) ABSTRACT

A fastening system includes a fastener having a shank with a threaded portion and a head region disposed at an end of the shank and defining a retaining cavity in an end thereof. A clip includes a base region snap fit in the retaining cavity of the fastener and an anchor region for anchoring a wire harness, hose, cable sheath or other component.

10 Claims, 4 Drawing Sheets

(56) References Cited

U.S. PATENT DOCUMENTS 7,614,602 B2 * 11/2009 Hutter, III ............... H02G 3/30
                                                      248/694
2007/0023586 A1 * 2/2007 Geiger ............... B60R 16/0215
                                                      248/71

* cited by examiner

LOW PROFILE BOLT/CLIP ASSEMBLY

FIELD

The present disclosure relates to a low profile bolt/clip assembly.

BACKGROUND AND SUMMARY

This section provides background information related to the present disclosure which is not necessarily prior art.

In automotive and other industrial applications, wire harnesses, hoses and other components are often anchored to a structure using specially designed clips and additional fasteners that can be secured to an engine or other component.

The present disclosure provides an attachment feature on an existing fastener that can be used to mount a retaining clip. In particular, the fastener can include a shank, having a threaded portion and a head region disposed at an end of the shank. The head region includes a cavity in an end thereof, with a radially inwardly extending retaining rim at an open end of the cavity. A clip is provided having a base region that is snap fit, wedge or other rim gripping design in the retaining cavity of the fastener and an anchor feature extending from the base region for retaining a wire harness, hose, cable sheath or other component. The fastener can be used to secure the components of an engine or other structure of an industrial machine and the head of the fastener can provide the added function of receiving the retaining clip.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to FIGS. 1-5, a low profile bolt/clip assembly 10 according to the principles of the present disclosure will now be described. The assembly 10 includes a fastener 12 and a retainer clip 14 that are designed to anchor a wiring bundle 16 or other hose, cable sheath or other component to a structure.

Figure 6:
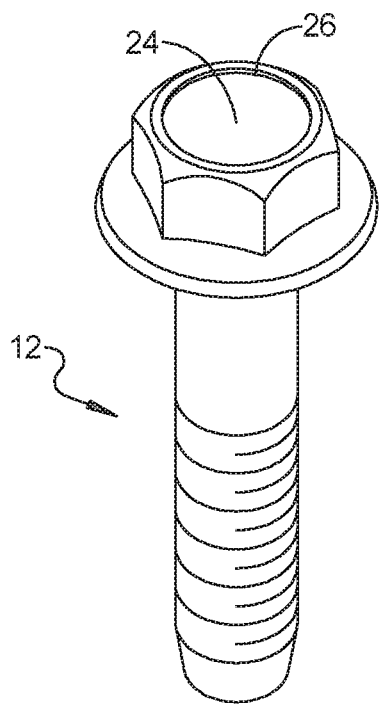
FIG. 6 is a perspective view of a fastener having a retaining rim according to one aspect of the present disclosure.
Figure 6A:
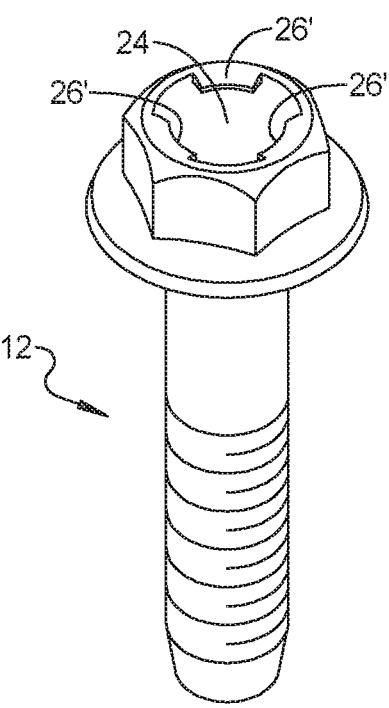
FIG. 6A is a perspective view of a fastener having a segmented retaining rim according to one aspect of the present disclosure.

The fastener 12 can be made from metal, plastic or other materials and can include a shank 18 having a threaded portion 20 and a head region 22 disposed at an end of the shank 18. The head region 22 defines a cavity 24 in an end thereof with a radially inwardly extending retaining rim 26 at an open end of the cavity 24. The radially inwardly extending retaining rim 26 can be formed, coined or staked around the entire cavity 24 to define a continuous rim 26 (best shown in FIG. 6). Alternatively, the cavity 24 can be provided with a segmented rim 26' so as to be discontinuous (see FIG. 6A). The cavity 24 can be cylindrical or polygonal in shape.

Figure 1:
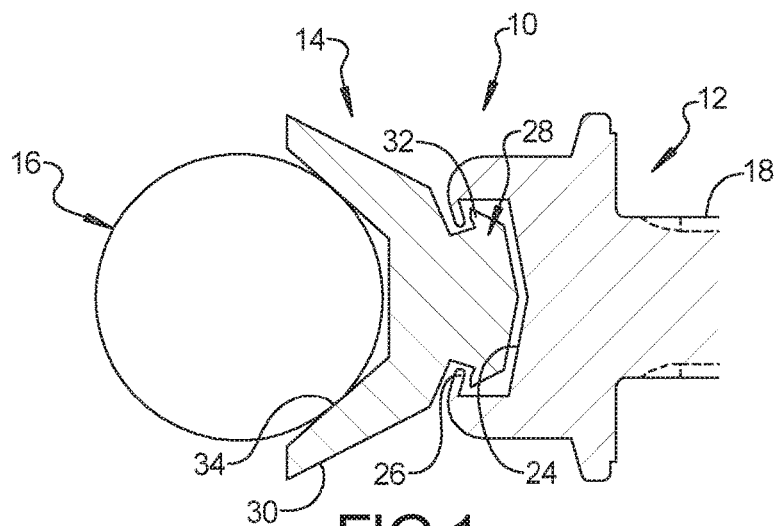
FIG. 1 is a schematic view of a low profile bolt/clip assembly according to the principles of the present disclosure.
Figure 2:
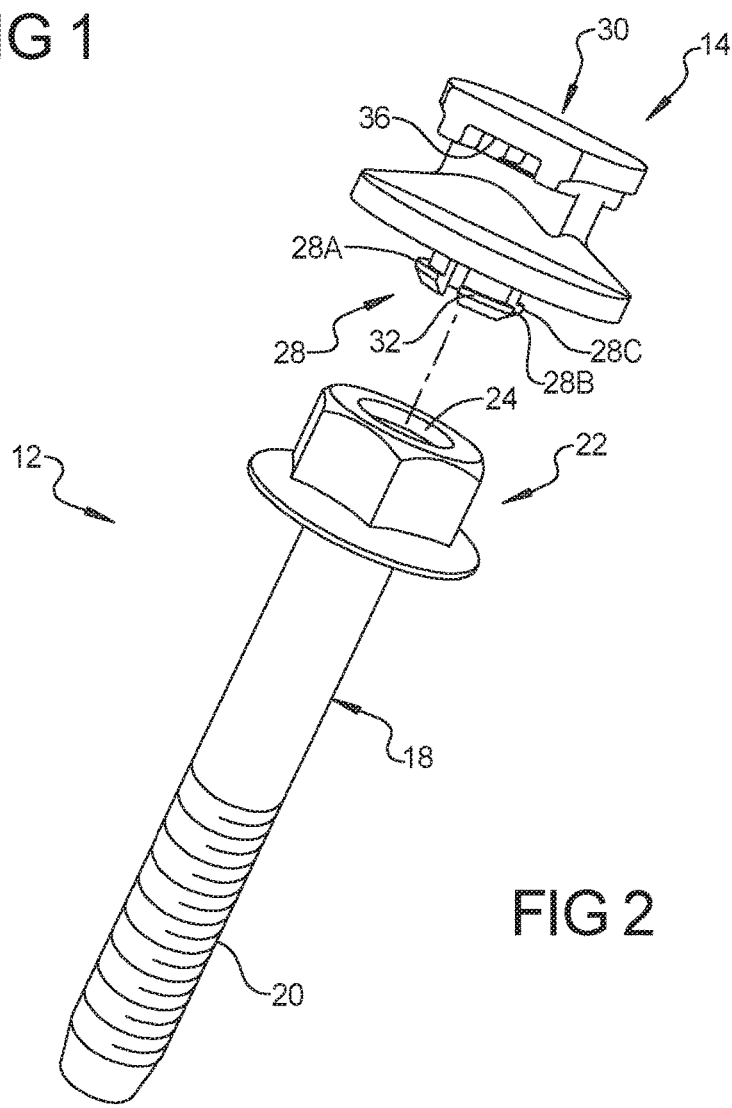
FIG. 2 is an disassembled perspective view of the low profile bolt/clip assembly according to the principles of the present disclosure.
Figure 3:
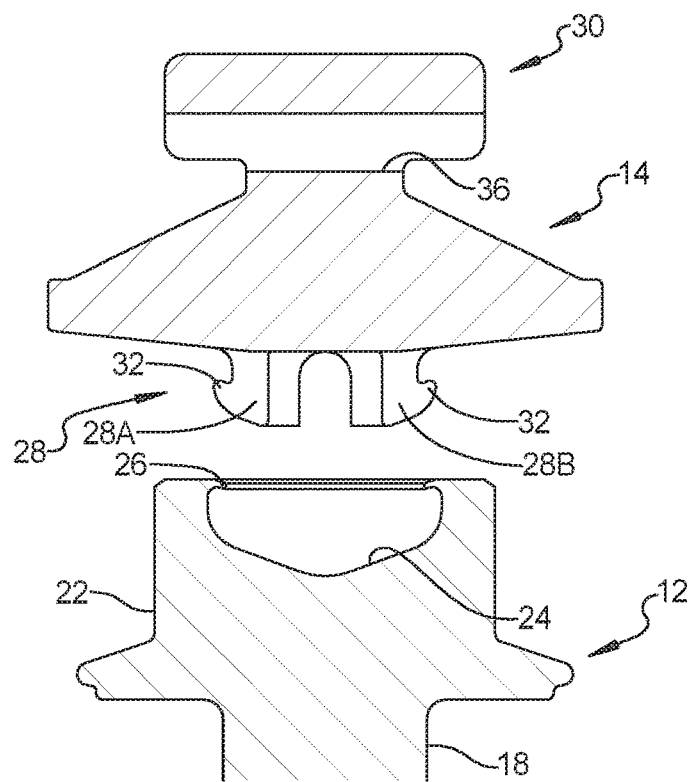
FIG. 3 is an disassembled cross-sectional partial view of the low profile bolt/clip assembly according to the principles of the present disclosure.
Figure 5:
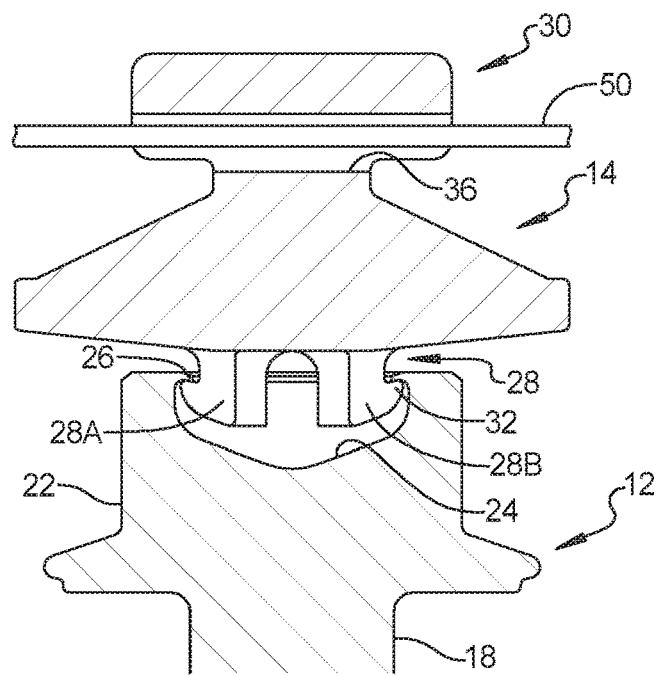
FIG. 5 is a partial cross-sectional view of the low profile bolt/clip assembly in an assembled condition according to the principles of the present disclosure.
Figure 4:
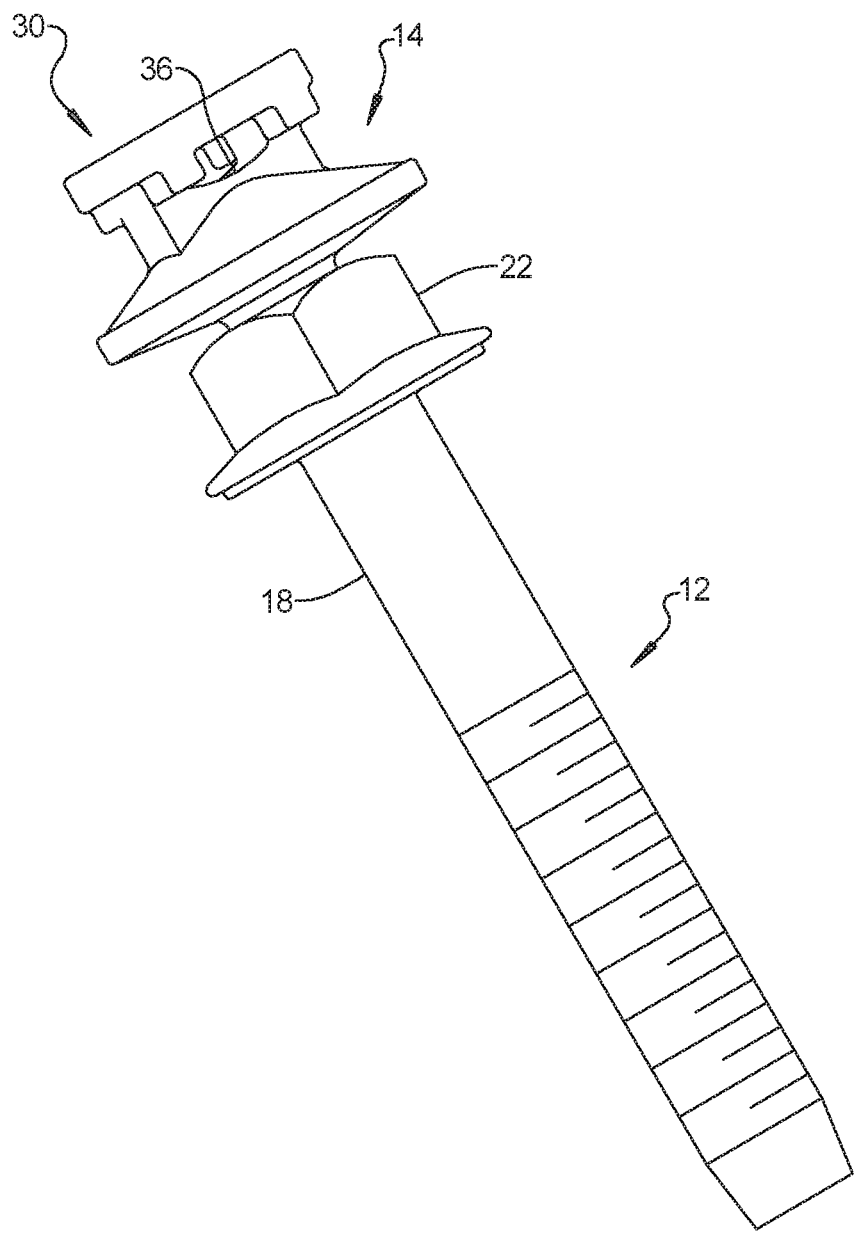
FIG. 4 is a perspective view of the low profile bolt/clip assembly in an assembled condition according to the principles of the present disclosure.
Figure 7:
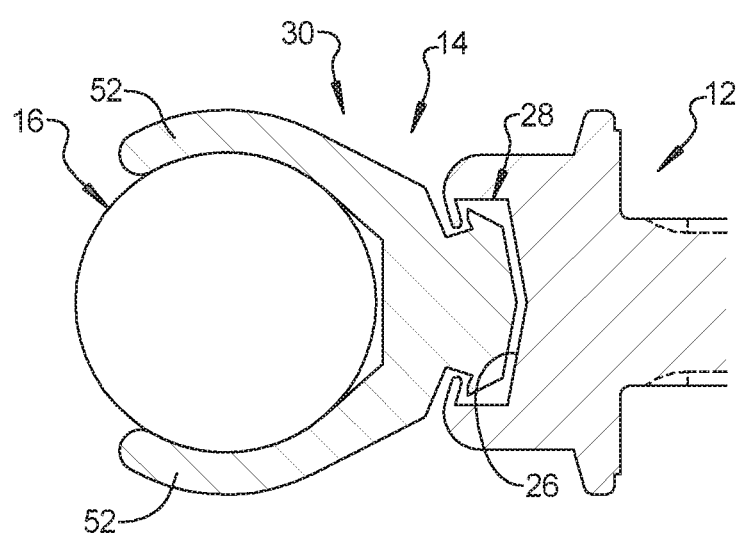
FIG. 7 is a cross-sectional view of an alternative clip design according to a further aspect of the present disclosure.

The retaining clip 14 can be made from plastic or other materials and can include a base region 28 that is snap-fit, press-fit, wedged or otherwise engaged in the cavity 24 of the fastener 12 with some other rim gripping design. An anchor feature 30 extends from the base region 28 and serves as a structure for retaining a wiring bundle 16 or other hose, cable or other component. As shown in FIGS. 2-5, the base region 28 of the retaining clip 14 includes a radially outwardly extending lip 32 that engages the radially inwardly extending retaining rim 26 of the fastener 12. The base region 28 can also be separated into multiple segments 28A-D that are spaced from one another and allow the base region 28 to flex during insertion into the cavity 24 of the fastener 12. The anchor feature 30 of the retaining clip 14 can take on various forms including a channel, strap, clamp, opening or other anchoring structure. As shown in FIG. 1, a channel 34 can be formed in which the wiring bundle 16 is received. With reference to FIG. 2, the retaining clip is provided with an opening 36 through which a zip-tie 50 (FIG. 5) or other clamp can be inserted for securing a wiring bundle, hose, cable sheath or other component to the retaining clip 14. Alternative integrally formed ties or clamp arms 52 (FIG. 7) can also be formed as part of the anchor feature 30 of the retaining clip 14 for receiving a wire bundle, cable sheath, hose or the like.

In operation, the base region 28 of the retaining clip 14 is snap fit, wedge or other rim gripping design in the cavity 24 of the fastener 12. The radially inwardly extending retaining rim 26 engages the radially outwardly extending lip 32 of the base region 28 to inhibit release of the base region 28 from within the cavity 24. The radially inwardly extending retaining rim 26 and the radially outwardly extending lip 32 can be hook-shaped and each can include a retaining shoulder that can be angled at various selected angles relative to a center axis of the fastener 12 to provide a desired resistance to removal of the base region 28 from the cavity 24.

The low profile bolt/clip assembly 10 according to the present disclosure creates an attachment feature on an existing engine component such as a fastener for use by other components without the use of additional bolts, bosses, nuts or increased weight. The unique bolt head design adds a simple retaining rim feature to a cavity in the bolt head for allowing the head to serve as a multi-functional component for receiving the retaining clip 14 therein. The bolt/clip assembly 10 simplifies the design for casting, machining and assembly features typically required for securing wire harnesses or other lightweight components to an engine or other structure. It reduces the component part numbers by incorporating the securing feature within the head of the bolt design. The present disclosure also reduces mass by not requiring casting bolt bosses, stud bolts and secondary nuts to the structure. The cost reduction by eliminating the need for unique stud bolts or separate mounting bolt features includes reductions in casting and machining costs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fastening system, comprising:
    a fastener having a shank with a threaded portion and a head region disposed at an end of the shank and defining a retaining cavity in an end thereof; and
    a clip having a base region engaged in the retaining cavity of the fastener and a retaining feature extending from the base region exterior to the retaining cavity of the fastener and including one of an opening extending perpendicular to an axis of the fastener and a pair of clamp arms for securing one of a wire harness, hose, and cable sheath.

2. The fastener system according to claim 1, wherein the clip is made from plastic.

3. The fastener system according to claim 2, wherein the base region of the clip includes a radially outwardly extending retaining lip that engages a radially inwardly extending retaining rim at an open end of the retaining cavity.

4. The fastener system according to claim 3, wherein the clip includes an anchor feature extending from the base region.

5. The fastener system according to claim 4, wherein the base region of the clip is snap-fit in the retaining cavity of the fastener.

6. A fastening system, comprising:
    a fastener having a shank with a threaded portion and a head region disposed at an end of the shank and defining a retaining cavity in an end thereof; and
    a clip having a base region engaged in the retaining cavity of the fastener;
    further comprising a wire harness attached to the clip.

7. The fastener system according to claim 6, wherein the clip is made from plastic.

8. The fastener system according to claim 6, wherein the base region of the clip includes a radially outwardly extending retaining lip that engages a radially inwardly extending retaining rim at an open end of the retaining cavity.

9. The fastener system according to claim 6, wherein the clip includes an anchor feature extending from the base region.

10. The fastener system according to claim 6, wherein the base region of the clip is snap-fit in the retaining cavity of the fastener.

* * * * *